Nov. 21, 1933.  C. J. BARRY  1,936,421
AUTOMOBILE BUMPER ATTACHMENT
Filed June 10, 1931
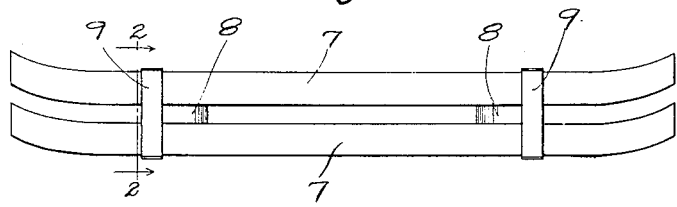
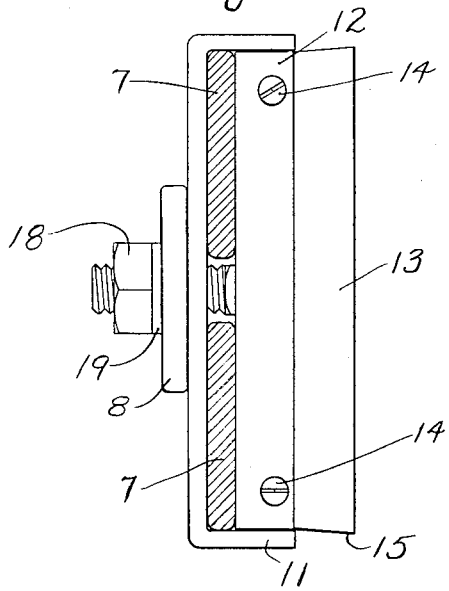
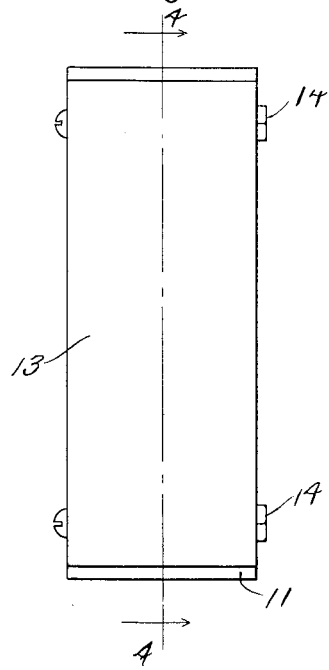
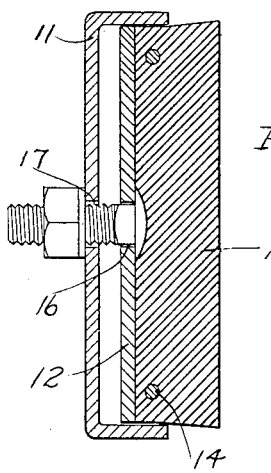
Inventor
Cornelius J. Barry
By George E. Mueller
Atty.

Patented Nov. 21, 1933

1,936,421

UNITED STATES PATENT OFFICE 1,936,421

AUTOMOBILE BUMPER ATTACHMENT

Cornelius J. Barry, Chicago, Ill.

Application June 10, 1931. Serial No. 543,317

6 Claims. (Cl. 293—55)

My invention relates to an automobile bumper and more particularly to a buffer for attachment to a bumper.

Automobiles are frequently provided with bumpers having a polished or plated metal finish which is often marred by collisions with other cars or objects.

In order to protect the finish on the bumper and also assist its absorbing the force of the impact in colliding with other objects, I provide, in accordance with the general principles of the invention, a resilient buffer attachable to a bumper and serving as an attaching means for securing the bumper bars to arms carried by the automobile.

An object of the invention is to provide a new and improved bumper.

A further object is to provide a combination buffer and attaching clamp for the horizontal bars of an automobile bumper.

A further object is to provide a device for protecting the bumper bars from damage in many types of impacts.

Other objects and advantages will appear as the description proceeds.

Referring to the drawing:

Fig. 1 is a perspective view of an automobile bumper embodying my invention,

Fig. 2 is a side elevation of a combined buffer and clamping device taken on line 2—2 of Fig. 1 and showing the bumper bars in section, Fig. 3 is a front elevation of the device shown in Fig. 2, and Fig. 4 is a sectional view taken on lines 4—4 of Fig. 3.

Referring now more in detail to the drawing, a pair of parallel bumper bars are shown secured to arms 8 carried by the automobile or other vehicle. The parallel bars 7 are usually nickel plated or cadmium plated and have a high lustre or polish. These bars frequently come into collision with the bumpers of other automobiles when driving in heavy traffic which mars the finish and appearance of the bars. For this purpose I provide a pair of buffers 9 which project forwardly from the bumper bars and thus absorb a majority of the shocks and impacts to which the bumper would otherwise be subjected. The buffer comprises a U shaped member 11 which lies against the back of the parallel bars 7 while the arms thereof project forwardly over the bars. Fitting between the arms of U shaped member 11 is a channel bar 12 in which a resilient buffing element 13, of rubber or other suitable material is anchored. This element 13 is inserted between the flanges of the channel bar and is secured in position by screws 14 which pass from one flange of the channel bar through the buffing element to the other flange of the channel bar. The forward end of the buffing element is preferably flared outward slightly as shown at 15. The channel bar is provided with a square aperture 16 through which a round headed bolt extends which also passes through a round aperture 17 in U shaped member 11. It will be noted that the buffer serves to attach the bumper bars 7 to the arms 8 of the automobile.

The bars 7 extend through the space between channel bar 12 and U shaped member 11; while the arm 8 is secured to the outside of the U shaped member by a nut 18 and lock washer 19. The device thus serves as a clamping means for securing the bumper bars to the arms of the car as well as a support for the buffing element 13.

The ends of the channel bar supporting the buffer element are closed by the arms of the U shaped member so that the socket for the buffer element encloses this element on all sides except for the portion projecting forwardly from the channel bar. Due to the fact that the bumpers on different automobiles are not all of the same height as measured from the ground, it will be seen that the buffer will nevertheless be effective through a large range of variations, since the buffer element extends vertically the full width of the bumper itself. It is this feature of the device which makes it readily adaptable to be used as a combination clamp for securing the bumper bars to the arms of the car.

It will be understood that the nature and embodiment of the invention herein described and illustrated is merely a convenient and useful form of the invention and that many changes may be made therein without departing from the spirit and scope of the invention.

What I claim is new and desire to protect by Letters Patent of the United States is:

1 In an automobile bumper having parallel bars and arms for securing the bars to the automobile, means for attaching the bars to said arms comprising a U shaped member, a channel bar fitting between the arms of said U shaped member, a resilient insert secured in said channel bar and projecting forwardly therefrom, and means for clamping said bumper bars between said U shaped member and channel bar.

2. In an automobile bumper having a horizontal bar and arms for attaching the bar to the automobile, means for securing said bar to said arms comprising a U shaped member fitting over said bar, a channel bar fitting between the arms of said U shaped member and clamping said bar, and a resilient insert in said channel bar extending forwardly to protect the bumper.

3. In an automobile bumper having a pair of parallel bars, a resilient buffer attachable to said bars comprising a U shaped member having arms extending forwardly over said bars, a channel bar fitting between the arms of said U shaped member and over said bars, a resilient insert in said channel bar extending forwardly to protect the bumper.

4. In an automobile bumper having a pair of parallel bars, a U shaped member having arms extending forwardly over said bars, a channel bar extending at right angles to said parallel bars and fitting between the arms of said U shaped member, and a resilient buffer anchored in said channel bar and projecting forwardly to protect the bumper, said buffer extending at right angles to said parallel bumper bars.

5. A buffer device for attachment to an automobile bumper bar, comprising a U-shaped member having arms adapted for projecting forwardly over the bumper bar, a channel bar fitting between said arms, a resilient buffer pad secured in said channel bar, and means including said U-shaped member for securing said device to the bumper bar.

6. A buffer device for attachment to an automobile bumper bar, comprising a U-shaped member having arms adapted for projecting forwardly over the bumper bar, a channel bar fitting between said arms and over said bumper bar, a resilient buffer pad carried in said channel bar and projecting forwardly therefrom, said U-shaped member and said channel bar apertured to receive a bolt, said bolt having a head thereon adapted for drawing the U-shaped member and channel bar together on opposite sides of the bumper bar whereby said buffer device is secured to said bumper bar.

CORNELIUS J. BARRY.